June 21, 1966  A. S. ALLESSON  3,256,766
COAXIAL TELESCOPE FOR USE IN A RANGEFINDER
Filed Oct. 27, 1961

INVENTOR
ARNE STELLAN ALLESSON

BY *Larson and Taylor*

ATTORNEYS 3,256,766
COAXIAL TELESCOPE FOR USE IN A
RANGEFINDER
Arne Stellan Allesson, Lidingo, Sweden, assignor to AGA
Aktiebolaget, a corporation of Sweden
Filed Oct. 27, 1961, Ser. No. 148,076
Claims priority, application Sweden, Nov. 28, 1960,
11,468/60
3 Claims. (Cl. 88—1)

The invention relates to a rangefinder comprising a light source for transmitting light in a predetermined direction by way of an optical system. The light is reflected at the far end of the path whose length is to be determined and returns in the same direction to a second optical system of the apparatus, from which it is translated to a receiver, in which a comparison takes place between some property of the transmitted and the received light for determining the time the light has required to traverse the path.

The invention is characterized in that the two optical systems are placed in coaxial arrangement in contrast to the customary arrangement of the systems being placed one beside the other. Since it is generally desirable for the two systems to be pointed accurately towards the same point, the coaxial arrangement yields a substantial advantage in that one system does not, as in prior arrangements, have to be movable relative to the other.

Figure 1:
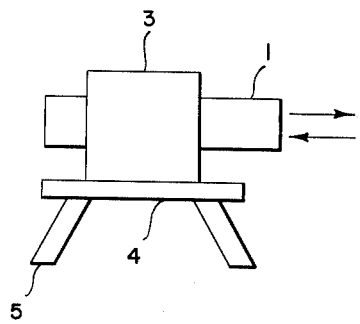
Figure 2:
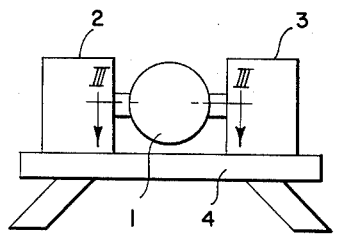
Figure 3:
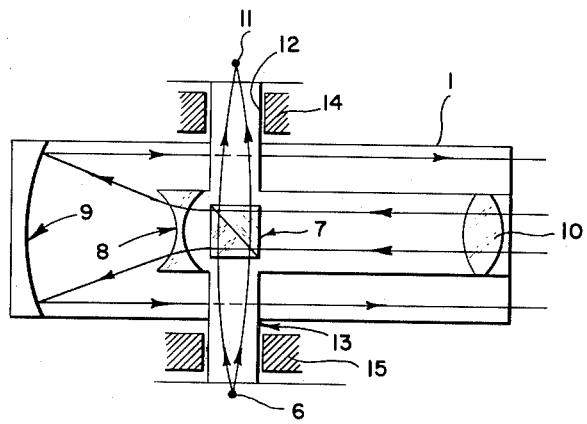

An embodiment of the invention is illustrated on the drawing, in which
FIGURE 1 is a schematic lateral view,
FIGURE 2 is an end view, and
FIGURE 3 is a section along the line III of FIGURE 2.

The apparatus comprises a tube 1, which is suspended rotatably between a pair of housings 2 and 3. The housing 2 forms a receiver section and the housing 3 a transmitter section. The housings stand on a base plate 4, through which the non-optical connections may pass that are required between the transmitter and receiver sections for the comparison of the transmitted and the received signal. The base section may be supported by legs 5.

FIGURE 3 shows the way in which the optical systems are arranged according to the invention. From a light source 6 the light is thrown towards a mirror surface arranged centrally in the tube 1 in the form of a double prism 7. The surface deflects the light rectangularly so as to make the light beam coaxial with the tube 1, the line of symmetry of which is the common optical axis of the two optical systems.

The first system is the one serving to transmit the light and comprises, in addition to one of the portions of the double prism 7, a diverging lens 8 and a concave mirror 9, by means of which the light beam is made parallel without any change of axis and is transmitted towards the far end of the path to be measured, at which a reflector, for instance, may be placed for returning the light. The reflected light is collected by a second optical system comprising a lens 10, from which the light is transferred to the second portion of the double prism 7, where it is again deflected rectangularly towards a receiver 11, such as a phototube.

The arrangement shown is of special advantage when it is desirable for the optical systems to be elevatable, i.e., movable in a vertical plane. The coaxial arrangement then provides a simple solution to the problem of building the optical systems into an elevatable unit, which is disposed in the tube 1. The axial directions of the two light beams that are at right angles to the tube axis may preferably coincide with the axis of the elevation movement of the tube. To this end, the tube comprises a pair of transverse tubular sections 12 and 13, which are journalled in bearings 14 and 15, respectively. The latter are mounted in the housings 2 and 3.

It is important to design the two optical systems so as to preclude any possibility of stray light from the transmitting system mixing with that of the receiving system. In the embodiment shown, such mixing is avoided with the aid of the mirror surfaces of the double prism 7 without impairment to the accuracy of the coaxiality of the two transverse light beams on the one hand and the axis of elevation on the other.

What is claimed is:

1. In a rangefinder, a first optical system having an axis, a second optical system having a common axis with said first optical system, said first and second optical systems being within a unit, means mounting said unit for rotational movement on an axis transverse of said common axis, a light source spaced laterally of said common axis and directing light coaxially along said transverse axis, said first optical system including means for receiving light from said light source and for transmitting light in a first direction toward a remote reflector along said common axis, said second optical system including means for receiving light traveling in a second direction from a remote reflector of the transmitted light and for directing received light coaxially along said transverse axis and means spaced laterally of the said common axis and of said optical system for receiving said transversely directed light.

2. Apparatus as in claim 1, in which a pair of rectangular prisms having contiguous base surfaces forms a part of said optical systems and wherein said prisms are positioned to change the direction of light received from said light source and from a remote reflector.

3. In a rangefinder, a first optical system having an axis, a second optical system having a common axis with said first optical system, said first and second optical systems being within a unit, frame means mounting said unit for rotational movement with respect to said frame and on an axis transverse of said common axis, a light source mounted on said frame means and spaced laterally of the said common axis for directing light coaxially along said transverse axis, said first optical system including means for receiving light from said light source and for transmitting light along the said axis, a second optical system including means for receiving light from a remote reflector of the transmitted light and for directing received light coaxially along said transverse axis, and means mounted on said frame spaced laterally of the said common axes and of said optical system for receiving said transversely directed light.

References Cited by the Examiner

UNITED STATES PATENTS 2,970,310  1/1961  Bruce _____ 88—1
3,006,234  10/1961  Herriott _____ 88—1

FOREIGN PATENTS 56,466  7/1952  France.
(1st addition to 983,923)

OTHER REFERENCES

Textbook, "Amateur Telescope Making—Advanced," Scientific American, Kingsport Press Inc., Kingsport, Tennessee, 1946, pages 333, 517 and 518 applied, QB 88.A62.

JEWELL H. PEDERSEN, Primary Examiner.

RONALD L. WIBERT, Assistant Examiner.